(12) United States Patent
Xu et al.

(10) Patent No.: US 12,486,826 B2
(45) Date of Patent: Dec. 2, 2025

(54) WIND POWER COLLECTION DEVICE, GAS STORAGE DEVICE, AND POWER GENERATION SYSTEM

(71) Applicant: TRANF TECHNOLOGY (XIAMEN) CO., LTD, Fujian (CN)

(72) Inventors: Shuidian Xu, Fujian (CN); Yanfu Li, Fujian (CN); Tao Xu, Fujian (CN)

(73) Assignee: TRANF TECHNOLOGY (XIAMEN) CO., LTD, Fujian (CN)

( * ) Notice: Subject to any disclaimer, the term of this patent is extended or adjusted under 35 U.S.C. 154(b) by 0 days.

(21) Appl. No.: 18/915,338

(22) Filed: Oct. 14, 2024

(65) Prior Publication Data
US 2025/0035084 A1 Jan. 30, 2025

Related U.S. Application Data

(63) Continuation of application No. PCT/CN2023/081953, filed on Mar. 16, 2023.

(30) Foreign Application Priority Data

Apr. 16, 2022 (CN) .......................... 202210400442.X (51) Int. Cl.
*F03D 3/06* (2006.01)
*F03D 3/00* (2006.01)
*F03D 9/17* (2016.01)

(52) U.S. Cl.
CPC ............. *F03D 3/061* (2013.01); *F03D 3/009* (2023.08); *F03D 9/17* (2016.05); *F05B 2250/15* (2013.01); *F05B 2260/422* (2020.08)

(58) Field of Classification Search
CPC . F03D 3/005; F03D 3/009; F03D 3/06; F03D 3/061; F03D 9/17; F05B 2240/213; F05B 2260/442; F05B 2250/15
See application file for complete search history.

(56) References Cited

U.S. PATENT DOCUMENTS 9,328,717 B1 * 5/2016 Walker ................... F03D 3/061
2006/0032361 A1 2/2006 Deschamps et al.
(Continued)

FOREIGN PATENT DOCUMENTS

CN 101035983 9/2007
CN 101918708 10/2013
(Continued)

OTHER PUBLICATIONS

"International Search Report (Form PCT/ISA/210) of PCT/CN2023/081953," mailed on Jun. 14, 2023, with English translation thereof, pp. 1-7.
(Continued)

*Primary Examiner* — Elton K Wong
(74) *Attorney, Agent, or Firm* — JCIPRNET (57) ABSTRACT

A wind power collection device, a gas storage device, and a power generation system, where the wind power collection device includes an impeller, an outer side wall of the impeller is composed of four mutually spliced flow guide surfaces, radial cross sections of the four mutually spliced flow guide surfaces correspond to four mutually spliced flow guide curves, the flow guide surfaces are formed by rotating and stretching the flow guide curves around an axis line of the impeller in an axial direction; and the flow guide curves include a segment of convex first logarithmic spiral line and a segment of concave second logarithmic spiral line, and the first logarithmic spiral line and the second logarithmic spiral line of the flow guide curves are smoothly and transitionally connected at one side close to the axis line.

20 Claims, 10 Drawing Sheets

(56) References Cited

U.S. PATENT DOCUMENTS

| | | | |
|---|---|---|---|
| 2010/0158697 A1 | 6/2010 | Kim | |
| 2010/0327596 A1 | 12/2010 | Williams | |
| 2011/0081243 A1 | 4/2011 | Sullivan | |
| 2011/0206526 A1 | 8/2011 | Roberts | |
| 2015/0098828 A1* | 4/2015 | Devisch | F01D 5/141 416/176 |
| 2017/0306925 A1* | 10/2017 | Rubio | F03D 3/005 |
| 2018/0171981 A1* | 6/2018 | Bergstrom | F03D 3/062 |

FOREIGN PATENT DOCUMENTS

| | | |
|---|---|---|
| CN | 103511178 | 1/2014 |
| CN | 204061044 | 12/2014 |
| CN | 109372696 | 2/2019 |
| CN | 110325741 | 10/2019 |
| CN | 113503222 | 10/2021 |
| CN | 113503223 | 10/2021 |
| CN | 114704426 | 7/2022 |
| CN | 216922346 | 7/2022 |
| CZ | 28023 | 3/2015 |
| DE | 202011004964 | 6/2011 |
| DE | 102017004714 | 11/2018 |
| JP | 3184859 | 7/2013 |
| KR | 20120110810 | 10/2012 |
| WO | 2019046877 | 3/2019 |

OTHER PUBLICATIONS

"Written Opinion of the International Searching Authority (Form PCT/ISA/237) of PCT/CN2023/081953," mailed on Jun. 14, 2023, with English translation thereof, pp. 1-7.

"Notification of Grant of Invention Patent Rights of China Counterpart Application", issued on May 15, 2024, with English translation thereof, p. 1-p. 6.

"Search Report of Europe Counterpart Application", issued on Jul. 3, 2025, p. 1-p. 6.

"Decision to Grant a Patent of Japan Counterpart Application", issued on Oct. 7, 2025, with English translation thereof, pp. 1-5.

* cited by examiner

WIND POWER COLLECTION DEVICE, GAS STORAGE DEVICE, AND POWER GENERATION SYSTEM

CROSS-REFERENCE TO RELATED APPLICATIONS

This application is a continuation of International Application No. PCT/CN2023/081953, filed on Mar. 16, 2023, which claims priority to Chinese Patent Application No. 202210400442.X filed on Apr. 16, 2022, both of which are hereby incorporated by reference in their entireties.

TECHNICAL FIELD

The present disclosure belongs to the technical field of wind engineering, and in particular, to a wind power collection device, a gas storage device, and a power generation system.

BACKGROUND

Wind energy is a kind of clean and harmless renewable energy. Our country is rich in wind energy resources, and the exploitable wind energy reserves are about 1 billion kW, of which land wind energy reserves is about 253 million kW (calculated data based on 10 m height above the ground on land), and offshore exploitable and available wind energy reserves is about 750 million kW, totaling 1 billion kW. The principle of wind drive is to convert the kinetic energy of the wind into mechanical energy, and then apply the mechanical energy to other fields, such as power generation.

For example, the Chinese invention patent "CN201811623274.0" proposed "power generation system for collecting compressed air by using wind power as power", which uses compressed air to store energy and "splices" intermittent wind energy, where the stored compressed air is converted into mechanical energy through a gas power device to drive a generator, so as to achieve stable and controllable output. However, this technical solution is to drive by transforming a horizontal axis fan, which is disadvantageous for a horizontal axis wind blade to counter-wind steering, easy to cause "counter-wind loss" and has a low utilization of wind energy. Furthermore, the blade of the horizontal axis fan is tens or even a hundred meters, with large setting area, loud pneumatic noise, high cost, and difficult installation, which is not conducive to distribution and construction in urban areas or residential areas, and thus it is difficult to realize commercialization.

Therefore, it is necessary to design a wind power collection device with high cost performance, low noise, easy installation and maintenance, and easy distributed setting.

SUMMARY

In view of the technical problem of poor utilization of wind energy of wind turbine in existing technology, the present disclosure provides a wind power collection device, a gas storage device, and a power generation system to solve the above problem.

In a first aspect, the present disclosure provides a wind power collection device, including an impeller, where an outer side wall of the impeller is composed of four mutually spliced flow guide surfaces, radial cross sections of the four mutually spliced flow guide surfaces correspond to four mutually spliced flow guide curves, the flow guide surfaces are formed by rotating and stretching the flow guide curves around an axis line of the impeller in an axial direction; the flow guide curves each include a segment of convex first logarithmic spiral line and a segment of concave second logarithmic spiral line, and the first logarithmic spiral line and the second logarithmic spiral line of the flow guide curves are smoothly and transitionally connected at one side close to the axis line; it is defined that an extension line of the first logarithmic spiral line of each flow guide curve intersects with an extension line of the second logarithmic spiral line at point A, an endpoint of the first logarithmic spiral line of the flow guide curve away from the point A is B, and an endpoint of the second logarithmic spiral line of the flow guide curve away from the point A is C; and it is defined a length of AB line is $L_1$, and a length of AC line is $L_2$; then $L_1=0.8\text{-}1.2L_2$, and $\angle BAC=90\text{-}115°$.

In an embodiment, an angle of rotation of the flow guide curves at both ends of flow guide surfaces relative to the axis line of the impeller ranges from 80-100°.

In an embodiment, the first logarithmic spiral line and the second logarithmic spiral line are smoothly and transitionally connected by an arc-shaped curve.

In an embodiment, the wind power collection device also includes two circular cover plates, which are respectively arranged at both ends of the impeller, and both ends of the flow guide surfaces are hermetically connected with the cover plates.

In an embodiment, a diameter of the impeller is $D_1$, and a height of the impeller is H, and a proportional relationship between the diameter $D_1$ of the impeller and the height H of the impeller is $D_1=0.7\text{-}0.9H$; and a diameter of the cover plates is $D_2$, then $D_2=0.90\text{-}1.1D_1$.

In an embodiment, a diameter of inscribed circle of four segments of the flow guide curves is $D_3$, then $D_3 \leq 0.5D_1$.

In an embodiment, spiral angles of the first logarithmic spiral line and the second logarithmic spiral line range from 60-80°.

In an embodiment, a cover plate is connected with a rotating assembly, the rotating assembly includes a rotating shaft, and the rotating shaft is fixedly connected with a bottom wall of the cover plate.

In a second aspect, the present disclosure also provides a gas storage device, including a pressurizing device, a gas storage apparatus, and the wind power collection device as described above. The wind power collection device converts a wind power collected by the impeller into a rotating force of a rotating shaft, the rotating shaft drives the pressurizing device to compress an air, and the gas storage apparatus is used to store the air compressed by the pressurizing device.

In a third aspect, the present disclosure also provides a power generation system, including the gas storage device, a cyclone engine and a generator, where the cyclone engine is driven by the compressed air in the gas storage apparatus to drive the generator to generate electricity in a controllable and stable manner.

Compared with the existing technology, the present disclosure has the following beneficial effects:

(1) The impeller of the present disclosure has a design idea different from that of the traditional wind-driven device, where the blade of the traditional wind-driven device is a crescent-shaped concave part of the impeller, whereas the "blade" of the present disclosure is a concave part of the impeller, namely the flow guide surface, and such design idea is to make the wind from different directions form a cyclone in the flow guide surface of the impeller.

(2) A convex logarithmic spiral line segment and a concave logarithmic spiral line segment are used as basic composition of the flow guide curve, and a special attention may be paid to the fact that the impeller is formed by four flow guide surfaces spliced with each other, and an outer contour of radial cross-section of the impeller is four flow guide curves spliced with each other that are defined in terms of points A, B and C, length of AB line, length of AC line, z BAC, so that the flow guide surfaces have a suitable opening size and wind-receiving area. Through the arrangement of position of the logarithmic spiral line segment, winds in different directions may form a cyclone on the flow guide surfaces. The cyclone cyclically acts on the flow guide surfaces and constantly does work on the impeller so as to drive the impeller to rotate, changing the phenomenon of single action of airflow in the traditional blade design, thereby improving the efficiency of the wind power collection device and realizing the efficient utilization of wind energy.

(3) The present device has a low cost, is easy to install and transport, has a low noise, and is suitable for distributed settings to meet the requirements of different regions, and furthermore it can work normally in light wind, strong wind and even typhoon, and can be applied to small to large wind turbines and has high cost performance.

(4) Furthermore, the wind power collection device also includes two circular cover plates, the diameter of the cover plates is 0.95-1.1 times that of the impeller. Due to the sealing arrangement between the cover plates and the flow guide surfaces, a relatively closed space is formed at both axial ends of the impeller. This design is conducive to formation of a stable and continuous cyclone, which makes the cyclone do work on the flow guide surfaces for a longer time, thereby further improving the utilization efficiency of wind energy.

BRIEF DESCRIPTION OF DRAWINGS

Drawings are included to provide further understanding of the embodiments and are incorporated into and form part of this specification. Embodiments are illustrated in drawings, and used to explain the principles of the present disclosure together with descriptions. Other embodiments and their expected advantages will be easily recognized and will become better understood by referring to detailed descriptions below. Components in the drawings are not necessarily to scale with each other. The same reference signs refer to a corresponding similar part.

FIGS. 8-1 and 8-2 show simulation diagrams of airflow in a wind power collection device of an embodiment of the present disclosure.

The meanings of reference signs in the drawings are as follows: 1, impeller; 2, flow guide surface; 3, flow guide curve; 301, first logarithmic spiral line; 302, second logarithmic spiral line; 4, cover plate; 5, rotating assembly; 501, rotating shaft; 502, bearing; 503, bearing seat; 6, pressurizing device; 7, gas storage device; 8, cyclone engine; and 9, generator.

DESCRIPTION OF EMBODIMENTS

The present disclosure is further explained in detail in combination with the attached drawings and embodiments. It is understood that specific embodiments described herein are intended only to explain the present disclosure and not to limit the present disclosure. It should also be noted that, for ease of description, only the parts related to the present disclosure are shown in drawings.

It should be noted that embodiments and features therein of the present disclosure can be combined with each other without conflict. The present disclosure will be described in detail below with reference to the accompanying drawings and in combination with embodiments.

Figure 1:
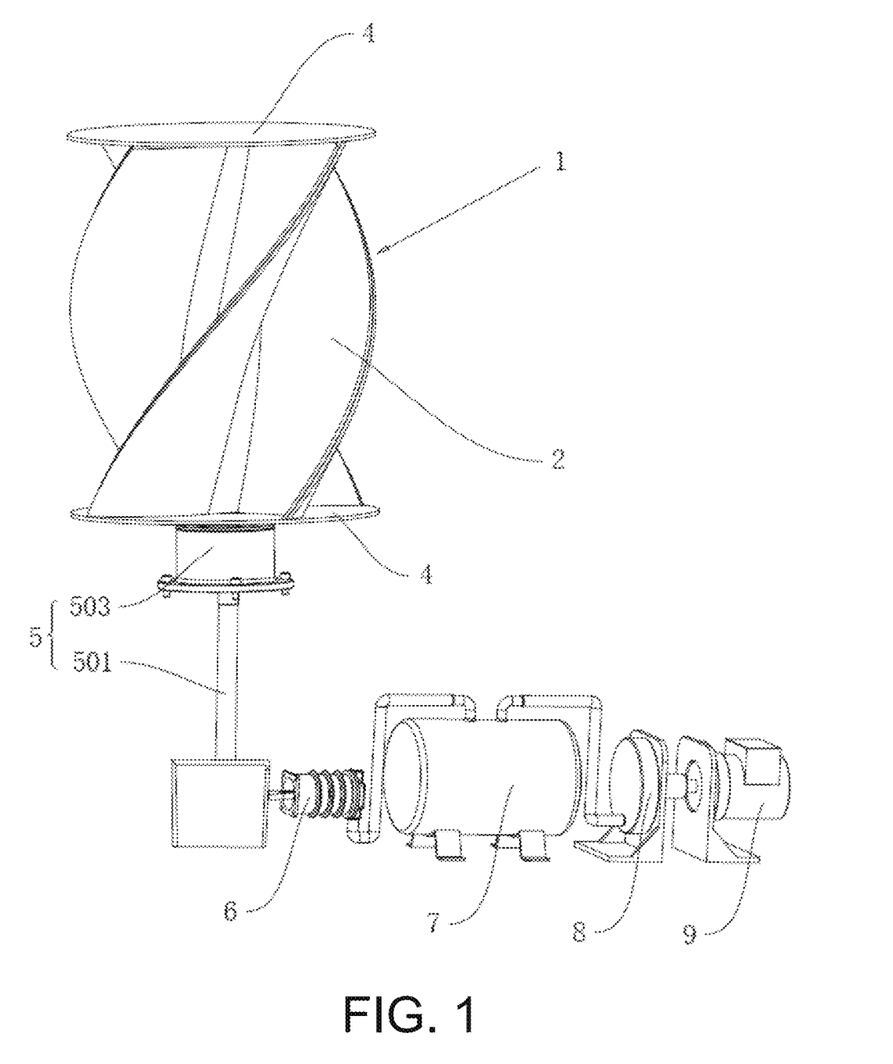
FIG. 1 shows a schematic diagram of an overall structure of a wind power collection device according to an embodiment of the present disclosure.
Figure 2:
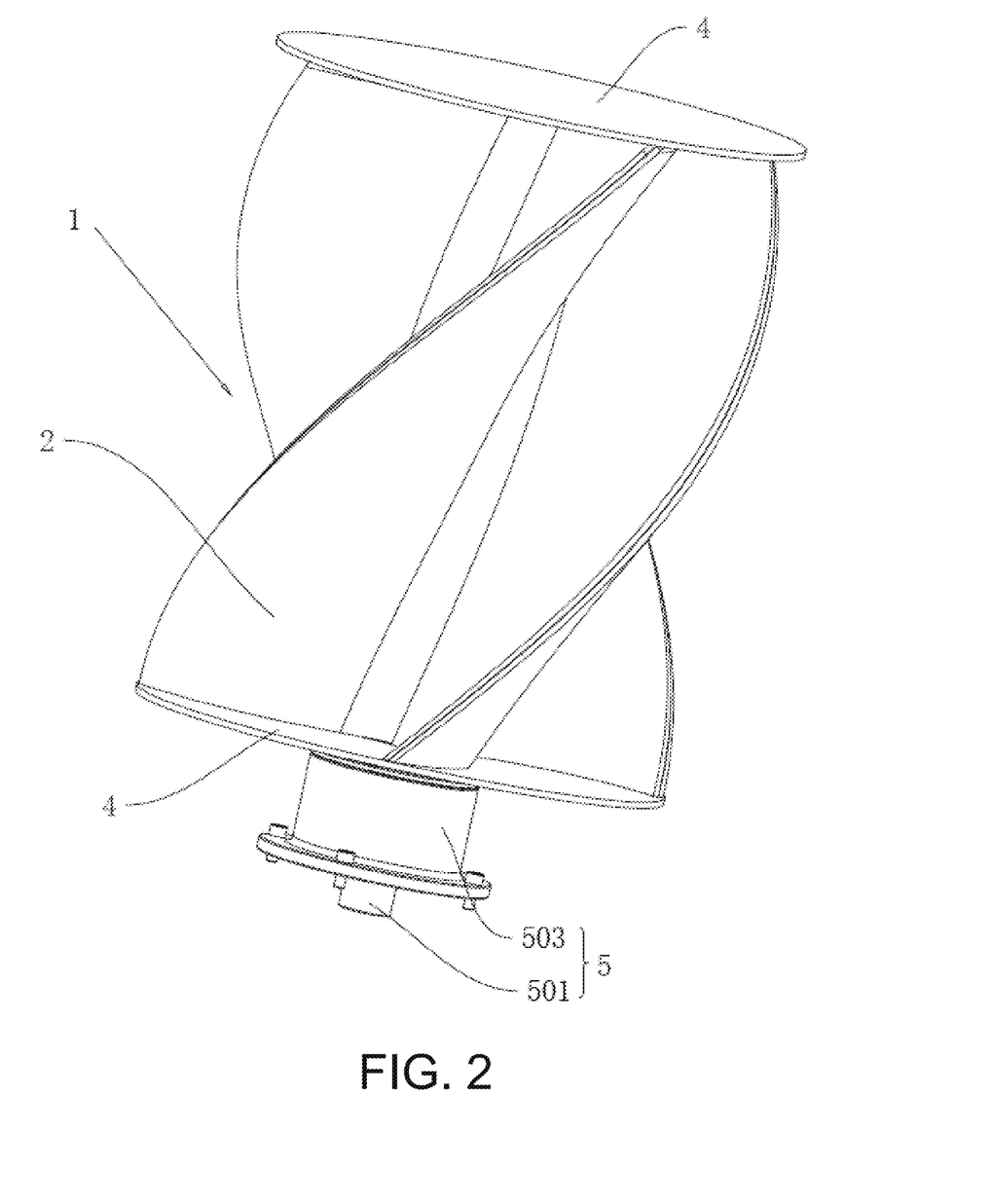
FIG. 2 shows a schematic structural diagram of a wind power collection device according to an embodiment of the present disclosure.

In a first aspect, the present disclosure provides a wind power collection device. FIG. 1 shows a schematic diagram of an overall structure of wind power collection device according to an embodiment of the present disclosure, as shown in FIGS. 1 and 2, the wind power collection device includes an impeller 1 and a rotating assembly 5. An outer wall of impeller 1 is composed of four flow guide surfaces 2, and the four flow guide surfaces 2 are mutually spliced in sequence around an axis line of the impeller 1 to form an outer side wall of the impeller 1.

Figure 3:
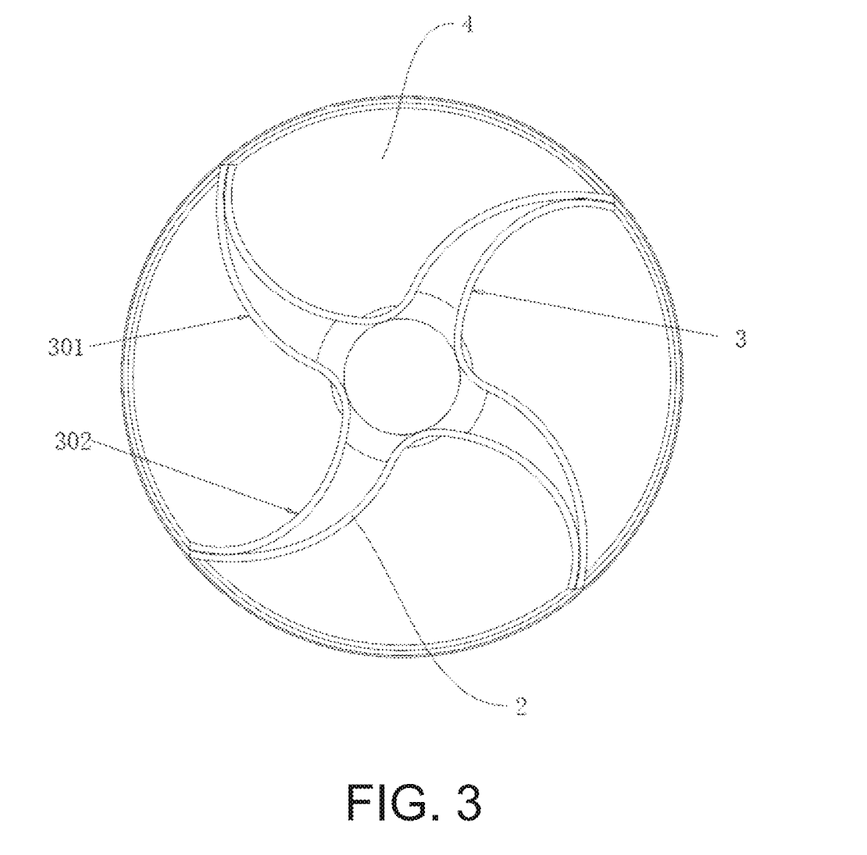
FIG. 3 shows a top view of a wind power collection device according to an embodiment of the present disclosure with cover plate removed.

Referring to FIGS. 2 and 3, different from a blade design idea of a traditional fan where an impeller 1 of the traditional fan is designed with respect to its blade (i.e., a crescent-shaped convex part of the impeller) and a rotating force of the impeller 1 is obtained by designing a pressure difference between a concave windward side of the blade and a convex leeward side corresponding to the windward side when an airflow does work for a single time when receiving wind, the impeller 1 of the present disclosure is designed with respect to the flow guide surfaces 2 so that winds from different directions form a cyclone in the flow guide surfaces of the impeller, thereby causing an airflow do work several times and thus improving wind energy utilization efficiency of the impeller.

Specifically, a radial cross section of each flow guide surface 2 corresponds to one flow guide curve 3. The flow guide curve 3 as a whole approaches its axis from both ends, that is, its convex and concave side faces, which approach its axis line from both ends to be connected with each other, are designed as a whole, and a design direction is to make winds from all directions suffered by the impeller 1 act together on the flow guide surfaces 2 to form a cyclone on the impeller 1. The cyclone acts cyclically on the flow guide surfaces, continuously does work on the impeller 1, and thus drives the impeller 1 to rotate, changing the phenomenon of single action of airflow in the traditional blade design, thereby improving the efficiency of the wind power collection device and realizing efficient use of wind energy.

The flow guide surfaces 2 are formed by rotating and stretching the flow guide curves 3 around an axis line of the impeller 1 in an axial direction. In this embodiment, the flow guide curves 3 rotate at a constant speed in an axial direction so that a helix angle of a connection line between endpoints of the flow guide curves 3 on a flow guide surface 2 is constant. In other embodiments, according to design requirements, a helix angle of a connection line between endpoints of the flow guide curves 3 on the flow guide surfaces 2 may vary within a certain range.

Each flow guide curve 3 mainly includes a segment of convex first logarithmic spiral line 301 and a segment of concave second logarithmic spiral line 302. Where, a smooth transition part between the first logarithmic spiral line 301 and the second logarithmic spiral line 302 is at a side thereof close to the axis line, and each flow guide surface 2 belongs to a separate whole and includes, in a cross-sectional direction thereof, one flow guide curve 3, which has one concave end and one convex end and the two ends of which are close to its axis in form of logarithmic spiral lines, and each flow guide curve 3 has an opening of about 90-115°.

For consistency of expression, the present disclosure firstly introduces a logarithmic spiral line structure and its related geometric and mathematical properties. Logarithmic spiral line is widely found in nature, ranging from nautilus shells, spider webs, sunflowers, to typhoons and the Galaxy. It is a curve in which an included angle (spiral angle) between a motion direction of a moving point and a polar radius is constant, has good geometric and mathematical properties, such as, intersecting with the polar radius at a constant angle, i.e., constant angle property; a curve obtained by telescopic transformation centered at a pole is still a logarithmic spiral line; a radius of curvature is an increasing function of a polar angle, i.e., gradient property.

Figure 4:
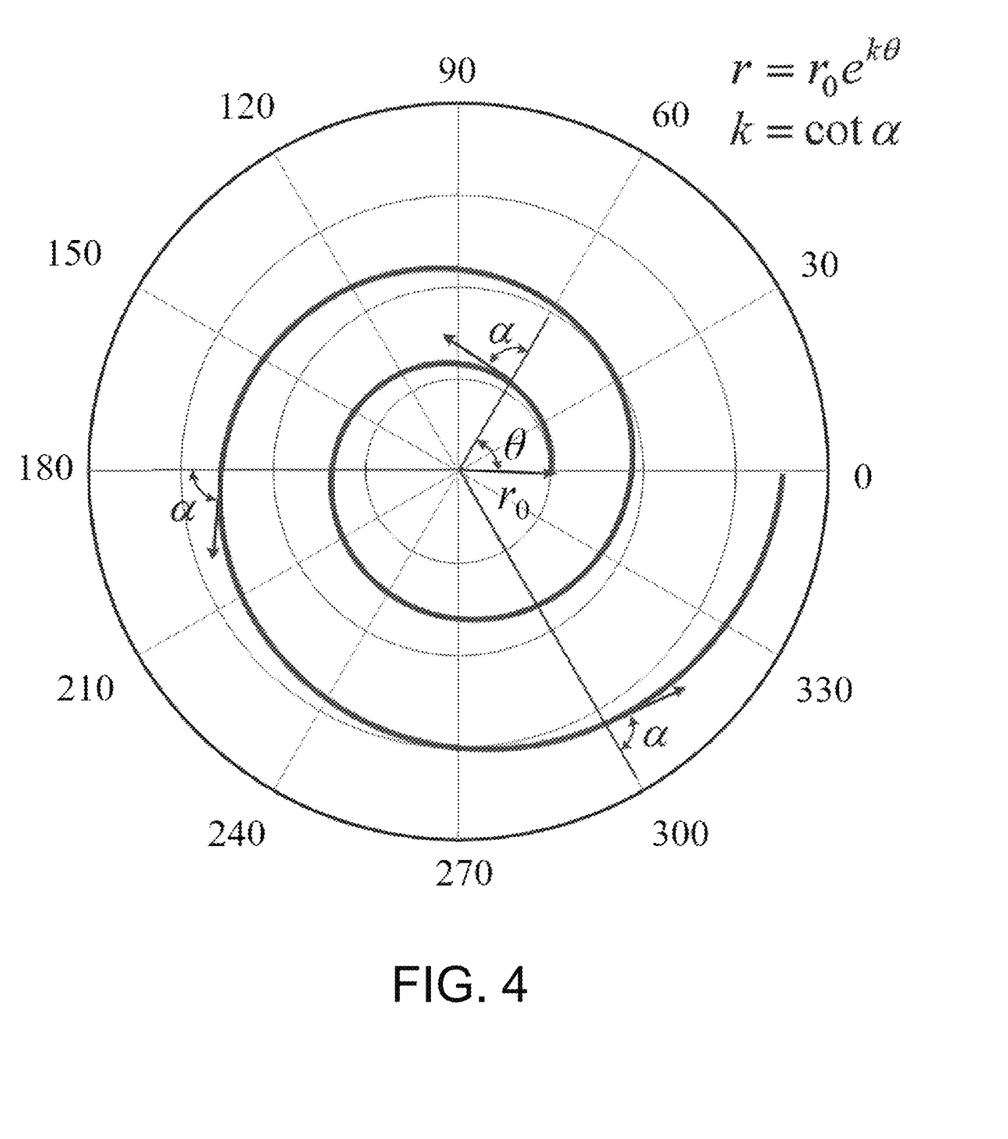
FIG. 4 shows a schematic structural diagram of a logarithmic spiral line in the present disclosure.

Logarithmic spiral line refers to a curve in which an included angle (spiral angle) between a motion direction of a moving point and a polar radius is always constant, as shown in FIG. 4, which is a schematic structural diagram of a logarithmic spiral line. Its polar coordinate analytic formula is:

$$r(\varphi) = r_0 \cdot e^{k\theta}$$

$k = \cot \alpha$ where $\alpha$ is a spiral angle, $\theta$ is a polar angle as an independent variable, and $r_0$ is an initial polar radius. It can be known from the properties of logarithmic spiral line that a logarithmic spiral line family with different initial polar radii for the same spiral angle has the same shape and properties. Therefore, the geometry of a logarithmic spiral line depends on the spiral angle.

The cross section of the four flow guide surfaces 2 of the impeller 1 is mutually spliced by the four flow guide curves 3, and each flow guide curve 3 corresponds to one flow guide surface 2.

Figure 5:
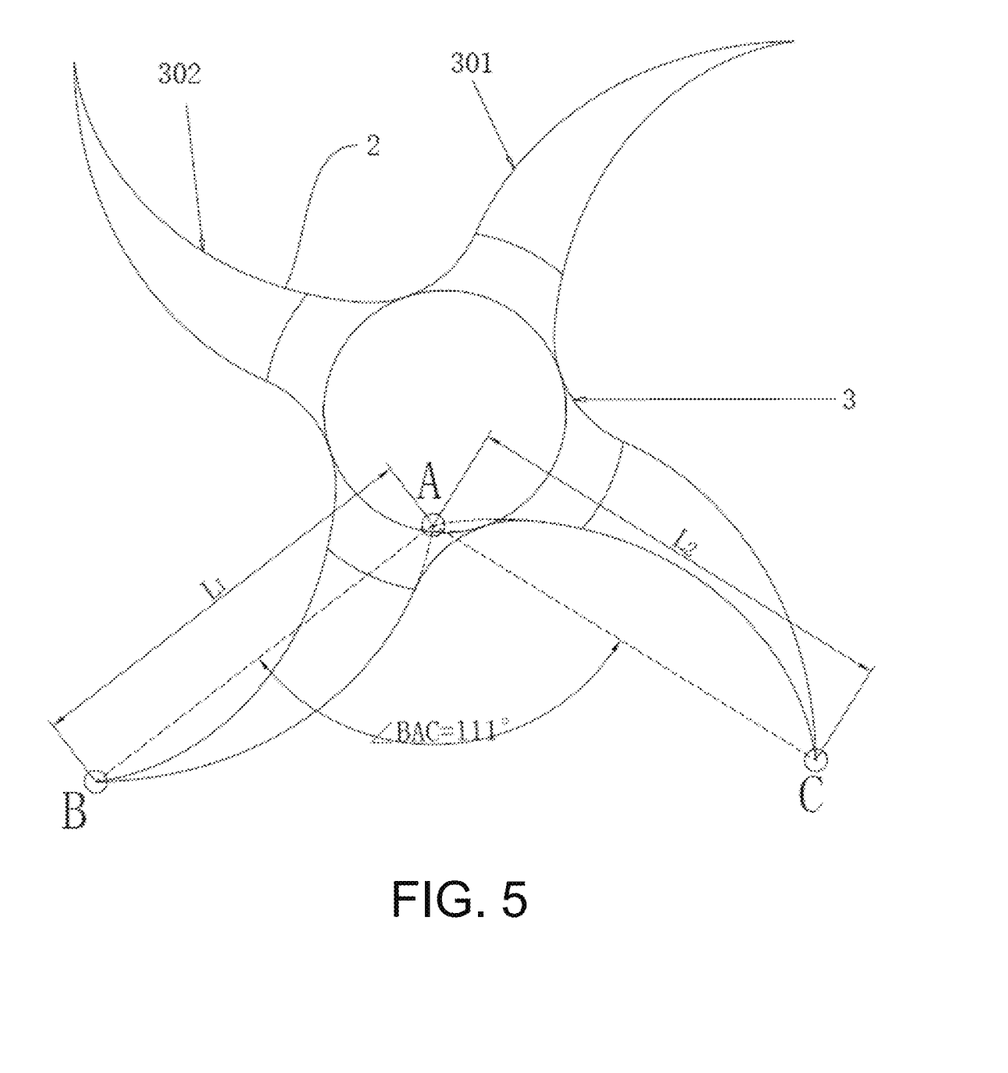
FIG. 5 shows a schematic diagram of a flow guide curve in a wind power collection device of an embodiment of the present disclosure.

Referring to FIGS. 3 and 5, it is further defined that an extension line of the first logarithmic spiral line 301 of a certain flow guide curve 3 intersects with an extension line of the second logarithmic spiral line 302 thereof at point A, and an endpoint of the first logarithmic spiral line 301 of this flow guide curve 3 away from the intersection point A is point B, an endpoint of the second logarithmic spiral line 302 of this flow guide curve 3 away from the intersection point A is point C, a length of AB line is defined as $L_1$, and a length of AC line is $L_2$, then $L_1 = 0.8$-$1.2L_2$, and $\angle BAC = 90$-$115°$, and where a spiral angle of the first logarithmic spiral line 301 and the second logarithmic spiral line 302 ranges from 60-80°.

Figure 7:
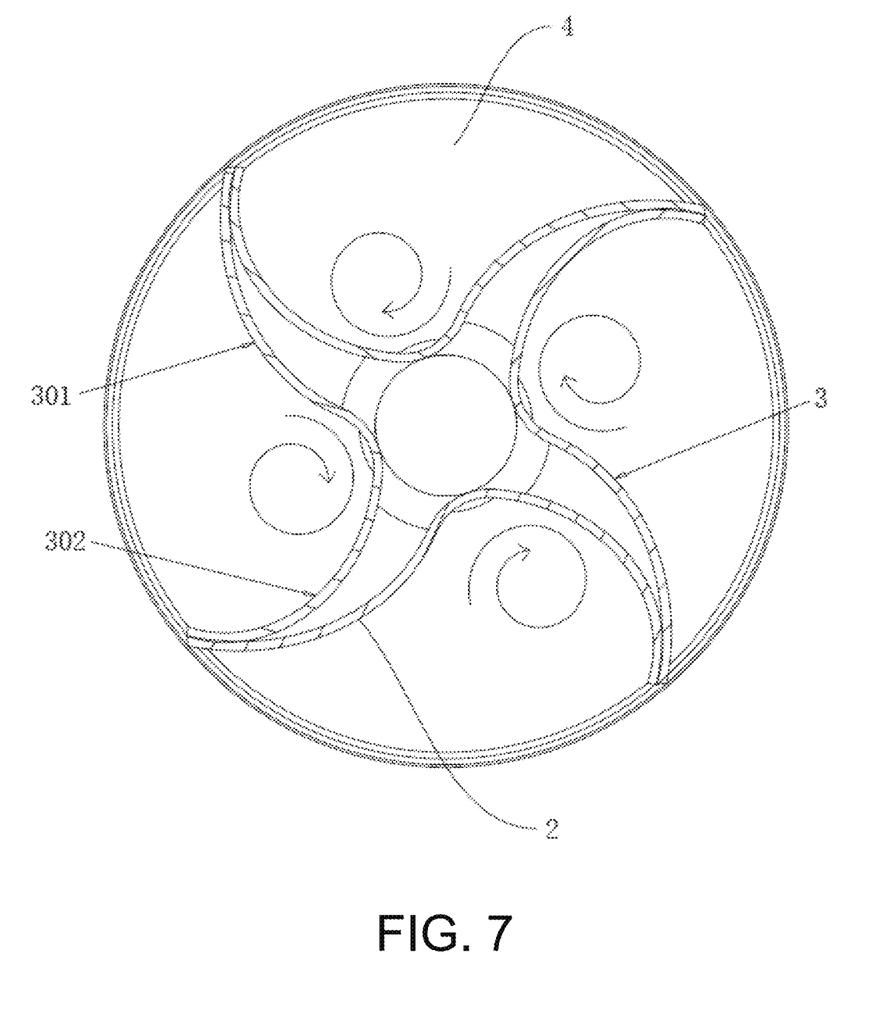
FIG. 7 shows a schematic diagram of airflow in a wind power collection device of an embodiment of the present disclosure.

Referring to FIGS. 2 and 7, an outer contour of a cross section of the impeller 1 of the present disclosure is four flow guide curves 3 connected end to end, and a design of the flow guide curves 3 is defined by the points A, B and C as well as the length of AB line, the length of AC line, and $\angle BAC$. The four flow guide curves 3 are rotated and stretched around the axis of the impeller 1 in the axial direction to form four flow guide surfaces 2 and to make the flow guide surfaces 2 have a suitable opening size and wind-receiving area. By utilizing the properties of the logarithmic spiral lines in the flow guide curves 3, such as always constant angle (spiral angle) between a motion direction of a moving point and a polar radius, gradient curvature, and the like, and by arrangement of positions of line segments of the logarithmic spiral lines, winds in different directions may form a cyclone on the flow guide surfaces 2, as shown in FIGS. 8-1 and 8-2. The cyclone cyclically acts on the flow guide surfaces 2 and constantly does work on the impeller 1 so as to drive the impeller 1 to rotate, changing the phenomenon of single action of airflow in the traditional blade design, thereby improving the efficiency of the wind power collection device and realizing the efficient utilization of wind energy.

It should be noted in particular that the flow guide surfaces 2 in the technical solution are only four in number, and a structure of having four flow guide surfaces 2 is an essential technical feature for formation of a cyclone effect. Compared with other existing technology in which there is no excessive requirement for the number of blade and in which the increase or decrease of the blade in a certain range will not cause an essential difference, in the present technical solution, only four flow guide surfaces 2 can be used. This is due to formation of cyclone has a requirement on an opening size of the flow guide curves 3. Since the flow guide curves 3 are formed by splicing each other around an axis line, if a structure of having three flow guide surfaces 2 is used, the opening size of the flow guide surfaces must will inevitably be above 120°, resulting in too small airflow rotation binding force and making it impossible to form a cyclone; and if five flow guide surfaces 2 are used, their opening size will be about 72°, resulting in too sharp rotation angle and making it impossible to form a cyclone, and furthermore too many flow guide surfaces 2 will make it difficult to form a cyclone since a contoured surface of an outer side wall of a single flow guide surface 2 has insufficient wind-receiving area when receiving horizontal wind in one direction.

In the present disclosure, the ratio of the length $L_1$ of AB line and the length $L_2$ of AC line is limited to not exceeding a certain range, and thus it is limited that the intersection point A is near a perpendicular bisector of BC line, that is, a smooth transition area between the first logarithmic spiral line 301 and the second logarithmic spiral line 302 is near the perpendicular bisector of BC line, so that airflow is constrained to change direction in the middle of the flow guide curves 3, and then is further constrained by the concave second logarithmic spiral line 302 to form a cyclone.

Referring to FIG. 5, in this embodiment, the first logarithmic spiral line 301 and the second logarithmic spiral line 302 of two adjacent flow guide curves 3 directly intersect in a sharp angle, that is, the four flow guide curves 3 are connected to each other head to tail. In this case, point B is an intersection point between the first logarithmic spiral line 301 of one flow guide curve 3 and the second logarithmic spiral line 302 of an adjacent flow guide curve 3; and point C is an intersection point between the second logarithmic spiral line 302 of one flow guide curve 3 and the first logarithmic spiral line 301 of an adjacent flow guide curve 3. On this basis, further, a range of ∠BAC is selected between 100-112°, which can enable the flow guide curves 3 to obtain better flow guidance effect.

Figure 6:
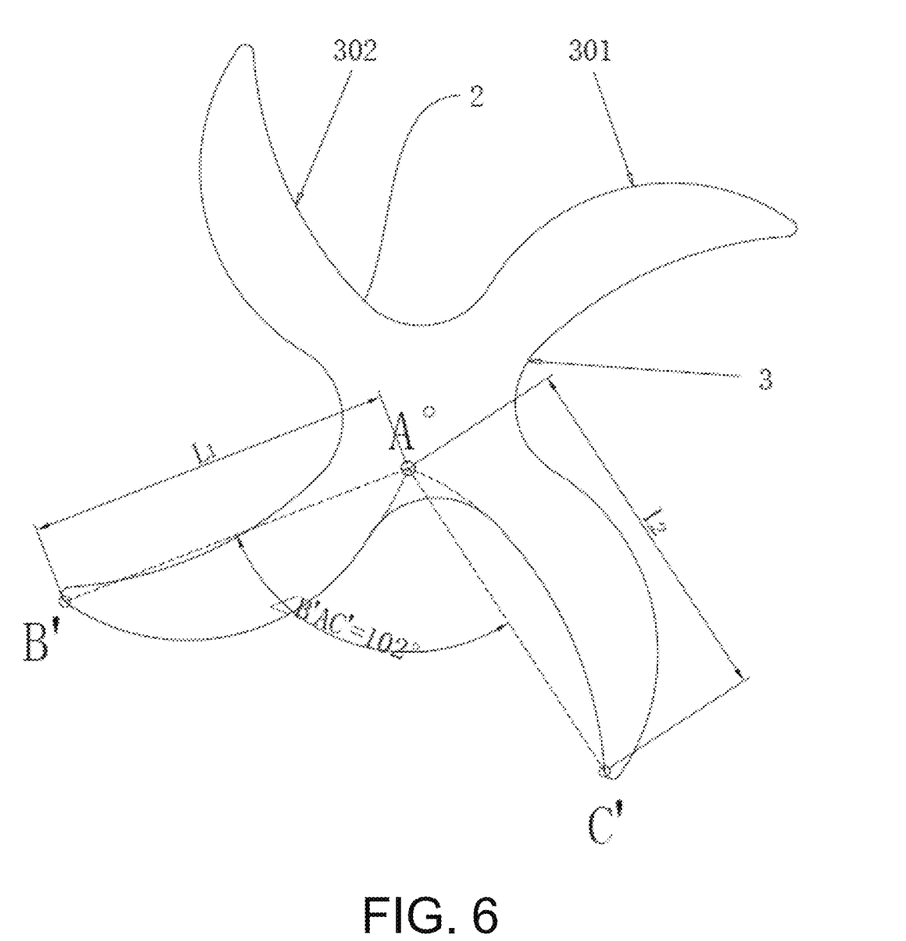
FIG. 6 shows a schematic diagram of a flow guide curve in a wind power collection device of another embodiment of the present disclosure.

In other embodiments, taking into account factors such as process, a chamfering treatment may be carried out at the connection of two adjacent flow guide curves 3, and at this time, there is a section of chamfered rounded or curved arc for transition between the first logarithmic spiral line 301 and the second logarithmic spiral line 302 of two adjacent flow guide curves 3, as shown in FIG. 6.

Taking one flow guide curve 3 as an example, an extension line of the first logarithmic spiral line 301 of the flow guide curve 3 intersects with an extension line of the second logarithmic spiral line 302 thereof at point A, and an endpoint of the first logarithmic spiral line 301 of the flow guide curve 3 away from the intersection point A is point B', and an endpoint of the second logarithmic spiral line 302 of the flow guide curve 3 away from the intersection point A is point C'. A technical feature thereof meets ∠B'AC'=90-115°, a length of AB' line is $L_1$, a length of AC' line is $L_2$, then $L_1$=0.8-1.2 $L_2$. In such an embodiment, the chamfered rounded or curved arc is only used for the splicing transition between two adjacent flow guide curves 3, has a relatively small length, and does not affect the efficacy of the flow guide surfaces formed by rotation and stretching of the flow guide curves, falling within the scope of the rights claimed for protection in the application.

Figure 9:
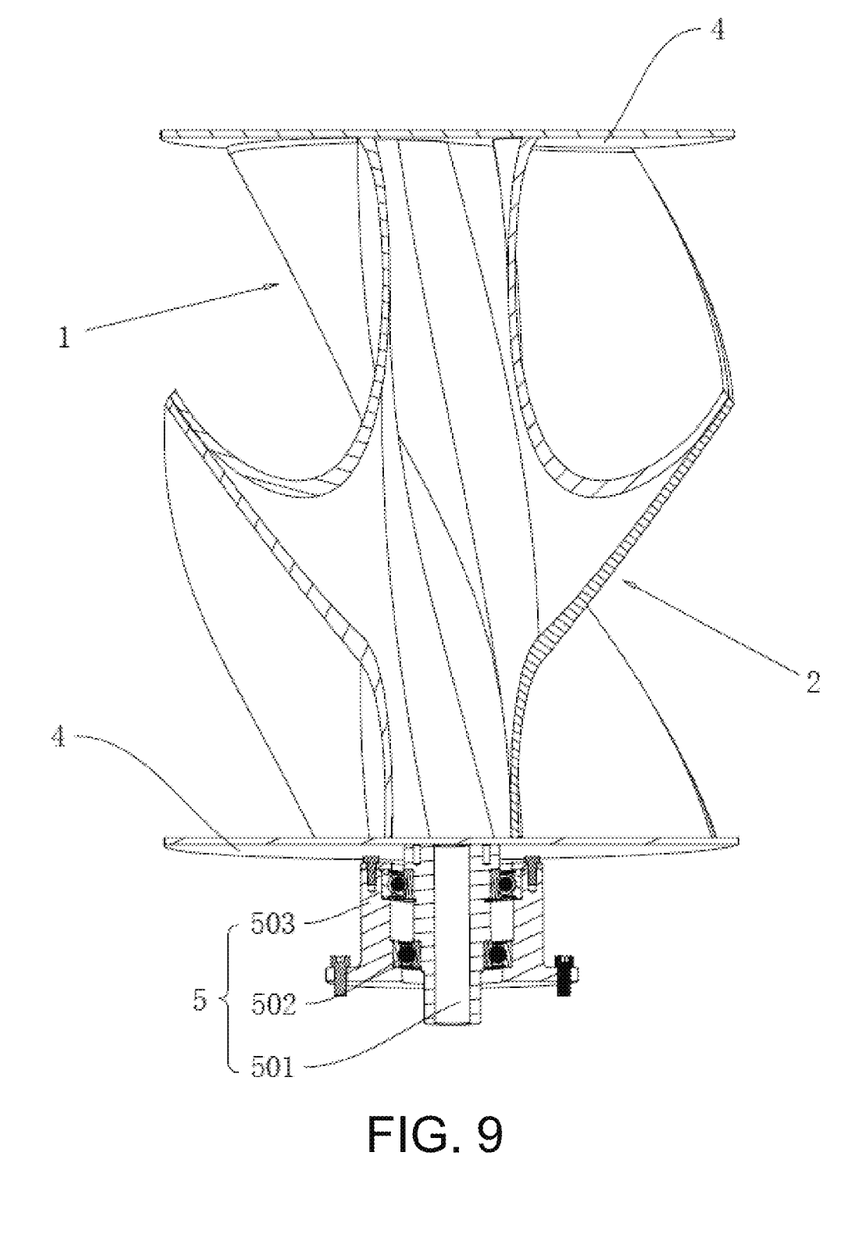
FIG. 9 shows partial sectional view of a wind power collection device of an embodiment of the present disclosure.

Furthermore, referring to FIGS. 3 and 9, a smooth transition connection is used between the first logarithmic spiral line 301 and the second logarithmic spiral line 302. In addition to the direct smooth transition connection, curves such as circular arc and logarithmic spiral line are may be used for transition connection. In this embodiment, an arc smooth transition connection is used between the first logarithmic spiral line 301 and the second logarithmic spiral line 302 to ensure a suitable transition opening and avoid too large or too small transition opening between the first logarithmic spiral line 301 and the second logarithmic spiral line 302. It should be noted that in the flow guide curves 3, the length of the first logarithmic spiral line 301 and the second logarithmic spiral line 302 should account for a main part of the length of the flow guide curves, such as 80%, or 85%-95%, that is, the middle curve used for smooth transition should not be too long.

Furthermore, in the present embodiment, the wind power collection device further includes two circular cover plates 4, which are fixedly connected to both ends of the impeller 1 respectively. Where two ends of the flow guide surfaces 2 are hermetically connected with the cover plates 4 to ensure that the cover plates 4 and the impeller 1 form an integral structure. Due to the sealing arrangement between the cover plates 4 and the flow guide surfaces 2, a cyclone is closed at both axial ends of the impeller 1, which is conducive to forming a stable and sustained cyclone near the cover plates 4, thereby allowing the cyclone to do work on the flow guide surfaces 2 for a longer period of time and further improving the efficiency of wind energy utilization.

Furthermore, it is defined that a diameter of the impeller 1 is $D_1$, a height of the impeller 1 is H, a diameter of the cover plates 4 is $D_2$, then the diameter $D_1$ of the impeller 1, the height H of the impeller 1, and the diameter $D_2$ of the cover plates 4 has the following proportion relationship: $D_1$=0.7-0.9H, and $D_2$=0.95-1.1$D_1$.

Specifically, a rotation angle of the flow guide curves 3 on both ends of the flow guide surfaces 2 relative to the axis line of the impeller 1 is in a range of 80-100°, and an outer side wall of the impeller 1 is within the range of the rotation angle, which can ensure that the airflow guided into the impeller 1 can rush faster to the cover plates 4 at both ends thereof to form a sustained and stable cyclone.

An inscribed circle of four segments of flow guide curves 3 is made, and a diameter of the inscribed circle is defined as $D_3$, then $D_3 \leq 0.5D_1$, and in an embodiment, it is $0.2D_1 \leq D_3 \leq 0.3D_1$. With the range of $0.2D_1 \leq D_3 \leq 0.3D_1$, it is possible to obtain a sufficient deep depression of the flow guide surfaces 2 to collect wind power, and to leave enough space for installation of a rotating shaft 501, as well as to set a more suitable opening size through the points on each flow guide curve 3 located on the inscribed circle.

Specifically, in this embodiment, the height of the impeller 1 is 2 m, the diameter of the impeller 1 is 1.6 m, and the diameter of the cover plates 4 is 1.6 m. At this time, a mass of the wind power collection device is 100 KG (kilogram), and when a wind speed is 15 m/s and a speed of the wind power collection device is about 200 rpm, an output torque is about 420 N/m (excluding the moment of inertia).

In addition, in the wind power collection device, it is also possible to form another impeller 1 with a higher height by stacking multiple impellers 1 in the axial direction. Correspondingly, a diameter of this new impeller 1 can also be changed accordingly so as to achieve a better wind collection effect, which is not discussed more here. Therefore, it can be seen that the wind power collection device has a low cost, is easy to install and transport, and is suitable for distributed settings.

Specifically, referring to FIG. 9, in the present embodiment, the bottoms of the cover plates 4 are fixedly connected to a rotating assembly 5, which includes a rotating shaft 501, a bearing 502 and a bearing seat 503, where one end of the rotating shaft 501 is fixedly connected to the bottom walls of the cover plates 4, and the bearing 502 is rotationally connected within the bearing seat 503 and has an interference fit with the rotating shaft 501. Setting the rotation components 5 may ensure that the wind power collection device has a stable rotation effect, and the utilization of wind energy is further improved.

It should be noted that the rotating assembly 5 in this embodiment may also be replaced by other devices with the same effect and will not be discussed more here.

In a second aspect, the present disclosure also provides a gas storage device, as shown in FIG. 1, including a pressurizing device 6, a gas storage apparatus 7, and the wind power collection device as described above. The wind power collection device converts the wind power collected by the impeller 1 into a rotating force of the rotating shaft 501, the rotating shaft 501 drives the pressurizing device 6 to compress the air, and the gas storage device 7 is used to store the air compressed by the pressurizing device 6.

In a third aspect, the present disclosure also provides a power generation system, as shown in FIG. 1, including the gas storage device as described above, a cyclone engine 8 and a generator 9, where the cyclone engine 8 is driven by using the compressed air in the gas storage device 7 to drive the generator 9 to generate electricity in a controllable and stable manner.

A principle of the cyclone engine 8 is to convert the energy of the compressed air into mechanical energy. For example, the Chinese patent No. ZL201810944526.3 discloses a gas power device, including an outer ring, an inner annular surface of which is provided with a plurality of driving concave parts in a circumferential direction; a core body coaxially arranged in the outer ring and can rotate relative to the outer ring, an outer annular surface of the core body being provided with at least one nozzle, at least one row discharge port, and at least one secondary flow channel between the nozzle and the discharge port; at least one gas inlet passage communicated with the at least one nozzle; and at least one gas outlet passage communicated with the at least one discharge port; a gas enters from the gas inlet passage, is ejected out step by step through the nozzle of the core body and the secondary flow channel, and acts on at least two driving concave parts of the outer ring in the circumferential direction thereof, to generates thrust on these driving concave parts to push the outer ring to rotate and do work to achieve power output, and finally, the gas passes through the discharge port of the core body and is discharged through the gas outlet passage.

The wind power collection device may collect wind energy and convert it into potential energy of compressed gas regardless of whether the wind is strong or weak. The power generation system, by providing a valve on a pipeline communicating the gas storage device 7 with the cyclone engine 8, may control the rotation speed and torque of the cyclone engine 8 by an opening size of the valve, so that the generator 9 can output a stable and controllable current.

Figure 10:
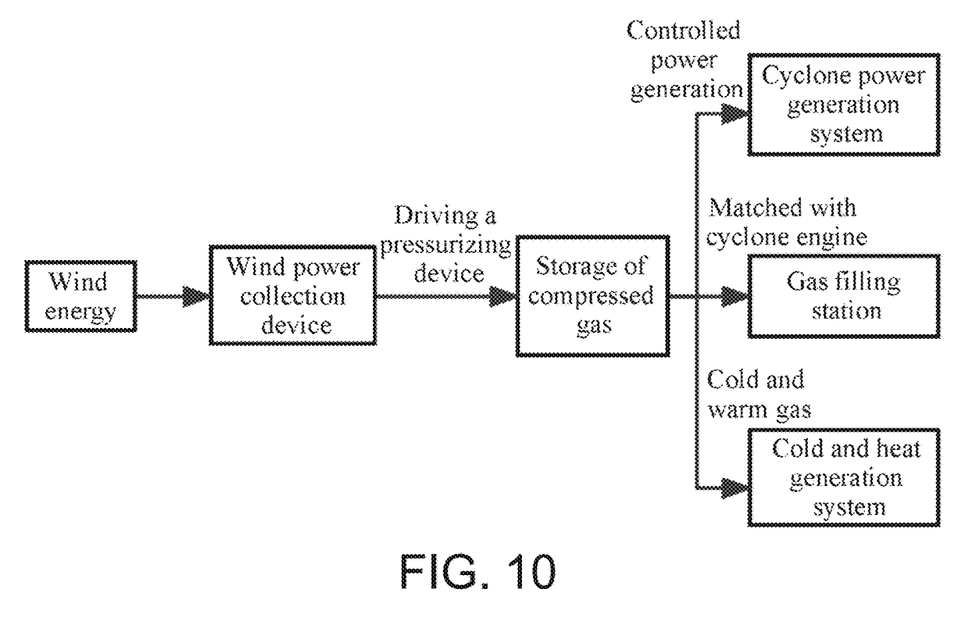
FIG. 10 shows a flow block diagram of an application scenario of an embodiment of the present disclosure.
Figure 81:
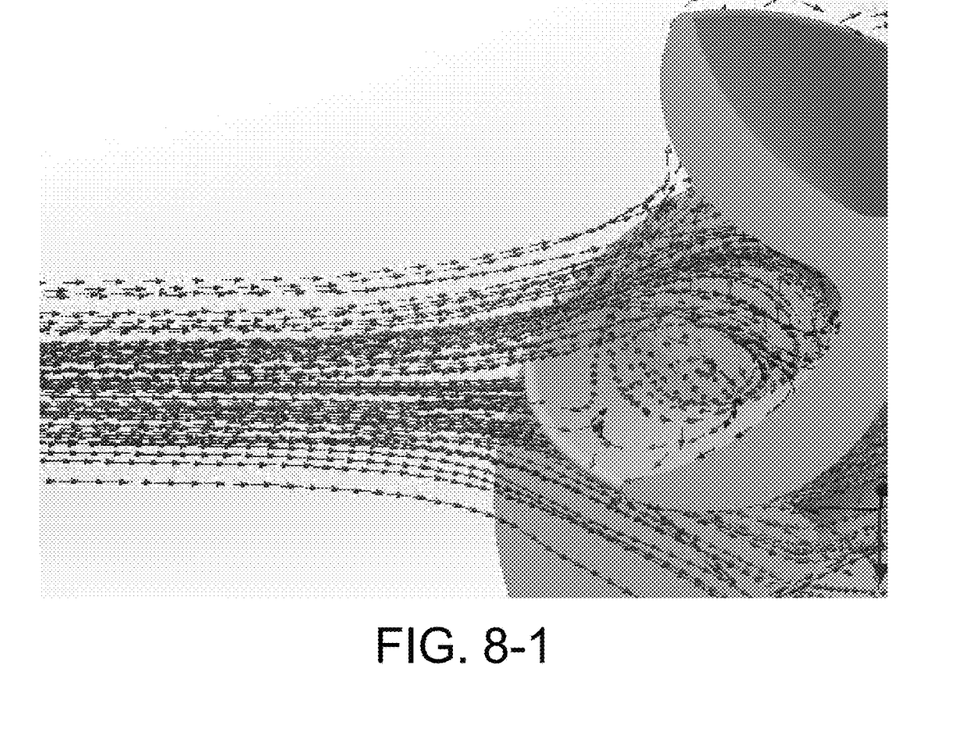
Figure 82:
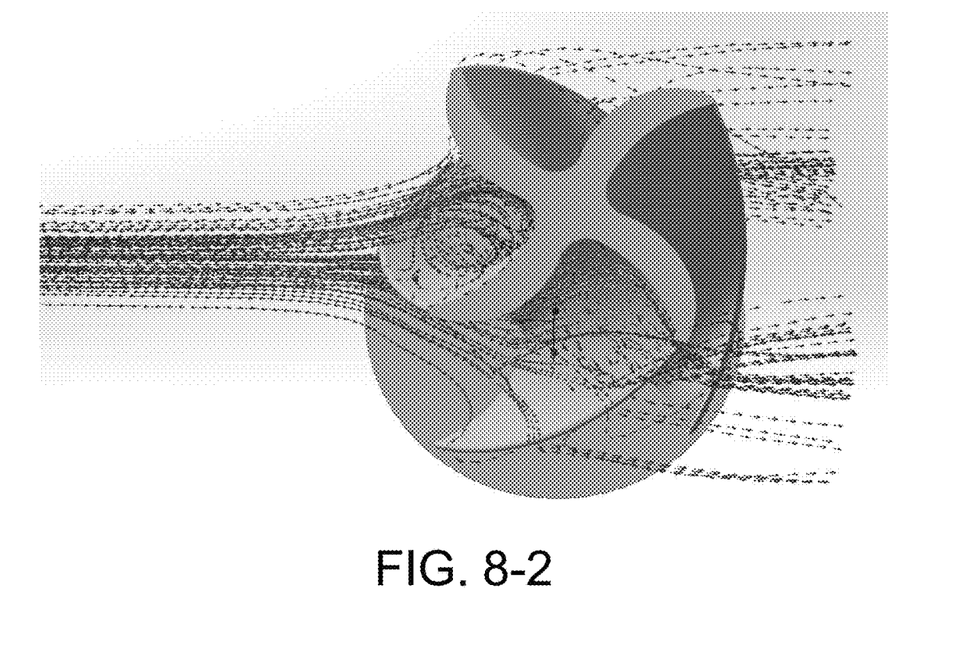

Referring to FIG. 10, it should be particularly noted that the power generation system is only one of application modes of technical solutions disclosed in the present disclosure, and the compressed air generated by technical solutions disclosed in the present disclosure may also be applied to a gas filling station as an air power energy supplement, and it may also be applied to a cold and heat generator to achieve such as cold and warm gas supply in the absence of electricity, or other different application scenarios.

The above describes specific embodiments of the present disclosure, but the scope of protection of the present disclosure is not limited thereto, and any changes or replacements that can easily be thought of by any skilled person familiar with the present technical field within the technical scope disclosed by the present disclosure shall be covered by the protection scope of the present disclosure. Therefore, the protection scope of the present disclosure shall be subject to the protection scope of the claims.

In the description of the present disclosure, it should be understood that the orientation or positional relationships indicated by the terms "upper", "lower", "inter", "outer", etc., are based on the orientation or position relationships shown in the accompanying drawings, they are only for facilitating the description of the present disclosure and simplifying the description, and do not indicate or imply that the device or element referred to must have a particular orientation, be constructed and operated in a particular orientation. Therefore, they cannot be understood as a limitation of the present disclosure. The wording 'include' does not exclude the presence of elements or steps not listed in the claim. The wording "a" or "an" before a component does not exclude the existence of a plurality of such components. Simple facts of certain measures being included in different dependent claims do not indicate that a combination of these measures cannot be used for improvement. Any reference symbol in claims shall not be explained as limiting the scope.

What is claimed is:

1. A wind power collection device, comprising an impeller, wherein an outer side wall of the impeller is composed of four mutually spliced flow guide surfaces, radial cross sections of the four mutually spliced flow guide surfaces correspond to four mutually spliced flow guide curves, the flow guide surfaces are formed by rotating and stretching the flow guide curves around an axis line of the impeller in an axial direction;

the flow guide curves each comprise a segment of a convex first logarithmic spiral line and a segment of a concave second logarithmic spiral line, and the first logarithmic spiral line and the second logarithmic spiral line of the flow guide curves are smoothly and transitionally connected at one side of the axis line; it is defined that an extension line of the first logarithmic spiral line of each flow guide curve intersects with an extension line of the second logarithmic spiral line thereof at point A, an endpoint of the first logarithmic spiral line of the flow guide curve away from the point A is B, and an endpoint of the second logarithmic spiral line of the flow guide curve away from the point A is C;

wherein, it is defined that a length of AB line is L1, and a length of AC line is L2; wherein L1=0.8-1.2L2; ∠BAC=90-115°.

2. The wind power collection device according to claim 1, wherein an angle of rotation of the flow guide curves at both ends of the flow guide surfaces relative to the axis line of the impeller ranges from 80-100°.

3. The wind power collection device according to claim 1, wherein the first logarithmic spiral line and the second logarithmic spiral line are smoothly and transitionally connected by an arc-shaped curve.

4. The wind power collection device according to claim 1, wherein the wind power collection device further comprises two circular cover plates, which are respectively arranged at both ends of the impeller, and both ends of the flow guide surfaces are hermetically connected with the cover plates.

5. The wind power collection device according to claim 4, wherein a diameter of the impeller is D1, a height of the impeller is H, and a proportional relationship between the diameter D1 of the impeller and the height H of the impeller is D1=0.7-0.9H; and a diameter of the cover plates is D2, wherein D2=0.90-1.1D1.

6. The wind power collection device according to claim 5, wherein an inscribed circle is made of the four mutually spliced segments of the flow guide curves, and a diameter of the inscribed circle of the four segments of the flow guide curves is D3, wherein D3≤0.5D1.

7. The wind power collection device according to claim 4, wherein at least one of the cover plates is connected with a rotating assembly, the rotating assembly comprises a rotating shaft, and the rotating shaft is fixedly connected with a bottom wall of the cover plate connected with the rotating assembly.

8. The wind power collection device according to claim 1, wherein spiral angles of the first logarithmic spiral line and the second logarithmic spiral line range from 60-80°.

9. A gas storage device, comprising a pressurizing device, a gas storage apparatus, and the wind power collection device according to claim 1, wherein the wind power collection device converts wind power collected by the impeller into a rotating force of a rotating shaft, the rotating shaft drives the pressurizing device to compress an air, and the gas storage apparatus is used to store the air compressed by the pressurizing device.

10. The gas storage device according to claim 9, wherein an angle of rotation of the flow guide curves at both ends of the flow guide surfaces relative to the axis line of the impeller ranges from 80-100°.

11. The gas storage device according to claim 9, wherein the first logarithmic spiral line and the second logarithmic spiral line are smoothly and transitionally connected by an arc-shaped curve.

12. The gas storage device according to claim 9, wherein the wind power collection device further comprises two circular cover plates, which are respectively arranged at both ends of the impeller, and both ends of the flow guide surfaces are hermetically connected with the cover plates.

13. The gas storage device according to claim 12, wherein a diameter of the impeller is D1, a height of the impeller is H, and a proportional relationship between the diameter D1 of the impeller and the height H of the impeller is D1=0.7-0.9H; and a diameter of the cover plates is D2, wherein D2=0.90-1.1D1.

14. The gas storage device according to claim 13, wherein an inscribed circle is made of the four mutually spliced segments of the flow guide curves, and a diameter of the inscribed circle of the four segments of the flow guide curves is D3, wherein D3≤0.5D1.

15. The gas storage device according to claim 12, wherein at least one of the cover plates is connected with a rotating assembly, the rotating assembly comprises the rotating shaft, and the rotating shaft is fixedly connected with a bottom wall of the cover plate connected with the rotating assembly.

16. The gas storage device according to claim 9, wherein spiral angles of the first logarithmic spiral line and the second logarithmic spiral line range from 60-80°.

17. A power generation system, comprising the gas storage device according to claim 9, a cyclone engine and a generator, where the cyclone engine is driven by the compressed air in the gas storage apparatus to drive the generator to generate electricity in a controllable and stable manner.

18. The power generation system according to claim 17, wherein an angle of rotation of the flow guide curves at both ends of the flow guide surfaces relative to the axis line of the impeller ranges from 80-100°.

19. The power generation system according to claim 17, wherein the first logarithmic spiral line and the second logarithmic spiral line are smoothly and transitionally connected by an arc-shaped curve.

20. The power generation system according to claim 17, wherein the wind power collection device further comprises two circular cover plates, which are respectively arranged at both ends of the impeller, and both ends of the flow guide surfaces are hermetically connected with the cover plates.

* * * * *